United States Patent [19]

Degen et al.

[11] Patent Number: 5,717,031
[45] Date of Patent: Feb. 10, 1998

[54] AQUEOUS ADHESIVE COMPOSITIONS

[75] Inventors: James B. Degen; Patrick A. Warren, both of Erie; Mark A. Weih, Edinboro, all of Pa.

[73] Assignee: Lord Corporation, Cary, N.C.

[21] Appl. No.: 492,939

[22] Filed: Jun. 21, 1995

[51] Int. Cl.⁶ .................. C08L 27/00; C08L 75/04
[52] U.S. Cl. .................. 525/129; 525/123; 524/589; 428/423.1; 428/421; 428/423.9; 428/407.1; 428/407.2; 428/407.3; 428/412.4; 428/413
[58] Field of Search .................. 428/423.1, 421, 428/423.9; 427/407.1, 407.2, 407.3, 413, 412.4; 524/589; 525/129, 123

[56] References Cited

U.S. PATENT DOCUMENTS

| | | |
|---|---|---|
| 3,282,883 | 11/1966 | De Crease et al. . |
| 3,325,333 | 6/1967 | Kigane et al. . |
| 3,830,784 | 8/1974 | Manino et al. . |
| 3,936,576 | 2/1976 | Kay . |
| 4,433,095 | 2/1984 | Hombach et al. . |
| 4,581,092 | 4/1986 | Westley . |
| 4,663,377 | 5/1987 | Hombach et al. . |
| 4,895,921 | 1/1990 | Schäfer et al. . |
| 4,904,522 | 2/1990 | Markusch . |
| 5,157,074 | 10/1992 | Metzger et al. . |
| 5,185,200 | 2/1993 | Tirpak et al. . |
| 5,191,012 | 3/1993 | Markusch et al. . |
| 5,200,489 | 4/1993 | Jacobs et al. . |
| 5,252,696 | 10/1993 | Laas et al. . |
| 5,254,199 | 10/1993 | Stepanski et al. . |
| 5,296,160 | 3/1994 | Tirpak et al. . |
| 5,354,807 | 10/1994 | Dochniak . |

FOREIGN PATENT DOCUMENTS

| | | |
|---|---|---|
| 0 021 186 | 6/1980 | European Pat. Off. . |
| 0 295 736 | 6/1988 | European Pat. Off. . |
| 43 08 528 | 3/1993 | Germany . |
| 1129408 | 10/1968 | United Kingdom . |
| WO 94/28078 | 5/1994 | WIPO . |

*Primary Examiner*—James J. Seidleck
*Assistant Examiner*—Duc Truong
*Attorney, Agent, or Firm*—Bell Seltzer Intellectual Property Law Group of Alston & Bird LLP

[57] ABSTRACT

An aqueous adhesive composition includes a water-dispersible polyisocyanate; an aqueous dispersion of a halogenated polyolefin elastomer; and a curing agent. The aqueous adhesive composition exhibits low VOC emissions and can be used to bond vulcanizable rubbers to a variety of substrates.

22 Claims, No Drawings

AQUEOUS ADHESIVE COMPOSITIONS

FIELD OF THE INVENTION

This invention relates to adhesive compositions, and in particular to aqueous adhesive compositions for laminating elastomers to a substrate.

BACKGROUND OF THE INVENTION

A variety of adhesive compositions are known for adhering vulcanizable elastomeric rubbers to a substrate, such as metal, ceramic, glass, and textile substrates. Many of these adhesive compositions are solvent based. For example, U.S. Pat. No. 3,830,784 describes an adhesive composition that includes a poly-c-nitroso aromatic compound, a polyisocyanate that is reactive at room temperature or greater, and an acidic halogen-containing polymer. The composition is produced by dissolving the acidic halogen-containing polymer and the aromatic polyisocyanate in an organic solvent, and the poly-c-nitroso aromatic compound is dispersed in the resulting solution. The resultant composition is shelf-stable and forms a strong adhesive bond between the substrate and the elastomer during vulcanization thereof.

U.S. Pat. No. 3,282,883 is directed to an adhesive composition that includes dinitroso benzene, chlorosulphonated polyethylene, and an orthoalkoxy aryl diisocyanate. Again, this composition is produced by dissolving and/or dispersing the components in an organic solvent. The resultant composition is capable of standing for long periods of time without gelling and of bonding a wide variety of elastomers, including previously cured elastomers and unvulcanized elastomers, together or to other solid substrates. The composition also is advantageous in that it produces bonds having high environmental resistance, for instance resistance to solvents and corrosive aqueous systems.

These and other solvent-based adhesive compositions provide several desirable characteristics, such as the capability to bond vulcanizable elastomers to a variety of substrates, good aging and weatherability properties, long shelf life, high bond strengths, and the like. However, because of increased environmental concerns regarding the release of volatile organic compounds (VOCs) which can result from the use of such solvent-based systems, it would be advantageous to provide aqueous based adhesive compositions.

There are a variety of aqueous adhesive compositions which are available for many fields of application. However, many of these aqueous-based compositions can have disadvantageous characteristics or limited applicability. One particular problem encountered in the formation of aqueous-based systems is the ability to disperse polyisocyanate compounds in water. Conventionally, aromatic polyisocyanates, such as toluene diisocyanate (TDI), methylene di-(phenylisocyanate) (MDI), and the like, are used in solvent-based systems. These types of compounds, however, can be substantially immiscible in water and do not readily disperse in an aqueous composition.

A variety of techniques have been proposed to increase the water dispersibility of polyisocyanate compounds. However, such aqueous dispersions can suffer from low bond strength, short pot life, and other characteristics which are disadvantageous in the production of vulcanizable elastomer/substrate articles and other products. Further, these compositions can have limited applications; for example, many such compositions may not effectively bond vulcanizable elastomers to any of a variety of substrates.

Accordingly, there exists a need for an adhesive composition which provides good bond strength between vulcanizable elastomer rubbers and a variety of substrates, and which is aqueous based, thereby eliminating or reducing environmental concerns regarding VOC emissions. It would also be advantageous to provide such an aqueous based composition which exhibits a suitably long pot life before the adhesive characteristics and abilities of the composition are significantly decreased.

SUMMARY OF THE INVENTION

The present invention is directed to aqueous adhesive compositions which provide a variety of desirable benefits. The aqueous adhesive compositions of the present invention can be used to bond a variety of substrates, such as metallic, ceramic, glass, and textile substrates, and the like, to vulcanizable elastomeric rubbers. The compositions of the invention provide good bond strength, comparable to and often better than that exhibited by solvent-based adhesive compositions. In addition, the aqueous adhesive compositions of the present invention are more environmentally acceptable, as compared to solvent-based systems. The aqueous adhesive compositions of the present invention have a substantially reduced VOC content and substantially reduced VOC emissions.

The aqueous adhesive compositions of the present invention include one or more water-dispersible polyisocyanates; an halogenated elastomeric polyolefin; and a curing agent. The water-dispersible polyisocyanate advantageously is substantially stable for at least about 24 hours after exposure to an aqueous environment. The polyisocyanates of the composition preferably are aliphatic or cycloaliphatic polyisocyanates or adducts thereof. In an especially preferred embodiment of the invention, the water-dispersible isocyanate is an isocyanurate group containing-polyisocyanate based on 1,6-hexamethylene diisocyanate.

The polyisocyanate is present in the adhesive composition of the invention in an amount of about 5 to about 55, preferably about 25 to about 35, percent by weight, based on the total weight of the solid components of the composition.

To provide or improve water dispersibility of the polyisocyanate, the polyisocyanate can be rendered hydrophilic by chemically modifying the polyisocyanate structure to add an hydrophilic group thereto, or by mixing the polyisocyanate with an external emulsifier, or both. Preferably the polyisocyanate is rendered hydrophilic by the addition of the polyisocyanate with a non-ionic ethylene oxide unit-containing polyether alcohol. When an external emulsifier is used, the emulsifier also preferably is the reaction product of the polyisocyanate with a non-ionic ethylene oxide unit-containing polyether alcohol.

The halogenated polyolefin elastomer is present in the aqueous adhesive composition of the invention as an aqueous dispersion thereof. Preferably the halogenated polyolefin elastomer is a chlorosulfonated polyolefin, and more preferably a chlorosulfonated polyethylene. The halogenated polyolefin elastomer is present in the aqueous adhesive composition of the invention in an amount of about 20 to about 60, preferably about 35 to about 45, percent by weight, based on the total weight of the solid components of the composition.

The curing agent is an agent capable of curing both the adhesive components and the vulcanizable elastomeric rubber to which the adhesive is applied. Preferably the curing agent is a nitroso compound. The nitroso compound can be an aromatic hydrocarbon, and preferably is a dinitrosobenzene. The curing agent is present in the aqueous adhesive composition of the invention in an amount of about 1 to about 30, preferably about 10 to about 20, percent by weight, based on the total weight of the solid components of the composition.

In addition, various additives such as fillers, dispersion aiding agents, viscosity controlling agents, acid scavengers, coating agents, and the like, may be included in the adhesive compositions in proportions known in the art. The total solids content of the adhesive of the invention is between about 5 and 60 percent, and preferably between about 35 and about 45 percent.

The aqueous adhesive composition has marked advantages over currently available adhesives. The adhesive has great versatility, being capable of bonding a wide variety of substrates including metallic, ceramic, glass, and organic substrates. Such substrates can be bonded using the aqueous adhesive compositions of the invention to a wide variety of vulcanizable elastomers, and is particularly useful for bonding glass fibers to butadiene-acrylonitrile rubbers.

The present invention also includes articles which include a vulcanized elastomeric portion adhesively bonded to a surface of a substrate by the aqueous adhesive composition of the invention, as well as processes for bonding a vulcanizable elastomer rubber to the surface of a substrate.

DETAILED DESCRIPTION OF THE INVENTION

As stated above, the aqueous adhesive compositions of the present invention comprise one or more water-dispersible polyisocyanates; an halogenated elastomeric polyolefin; and a curing agent. Particularly suitable polyisocyanates are those derived from monomers corresponding to the $R(NCO)_n$ formula, wherein R represents an aliphatic hydrocarbon radical containing 4 to 18 carbon atoms or a cycloaliphatic hydrocarbon radical containing 5 to 15 carbon atoms, and n is 1 to 3. It is also possible, although not preferred, to use polyisocyanates wherein R is an aromatic hydrocarbon radical containing 6 to 40 carbon atoms or an araliphatic hydrocarbon radical containing 7 to 40 carbon atoms, provided the aromatic polyisocyanate can form a stable dispersion in water, as defined below.

Also suitable are polyisocyanate adducts containing urea, biuret, urethane, allophanate, uretdione, carbodiimide, oxadiazinetrione and isocyanurate groups. These adducts may be prepared from any known polyisocyanates previously set forth by known methods. It is also possible to use mixtures of any of these polyisocyanates and/or polyisocyanate adducts.

Examples of suitable monomers of the polyisocyanates include, but are not limited to, 1,4-diisocyanatobutane, 1,5-diisocyanato-2,2-dimethylpentane, 2,2,4- and 2,4,4-trimethyl-1,6-diisocyanatohexane, 1,10-diisocyanatodecane, 4,4'-diisocyanato-dicyclohexylmethane, 1,6-hexamethylene diisocyanate, 1,12-dodecane diisocyanate, cyclobutane-1,3-diisocyanate, cyclohexane-1,3- and/or 1,4-diisocyanate, 1-isocyanato-3,3, 5-trimethyl-5-isocyanatomethyl cyclohexane (isophorone or IPDI), 2,4-and/or 2,6-hexahydrotoluylene diisocyanate, hexahydro-1,3- and/or 1,4-phenylene diisocyanate, perhydro-2,4'-and/or -4,4'diphenylmethane diisocyanate, 1,3-and/or 1,4-phenylene diisocyanate, 2,4- and/or 2,6-toluylene diisocyanate, diphenyl methane-2,4'-and/or -4,4'-diisocyanate, naphthalene-1,5-diisocyanate, triphenyl methane-4,4'4"-triisocyanate and polyphenyl polymethylene polyisocyanates obtained by phosgenating-aniline/formaldehyde condensation products.

In an especially preferred embodiment of the invention, the water-dispersible isocyanate is an isocyanurate group containing-polyisocyanate based on 1,6-hexamethylene diisocyanate. These and other suitable polyisocyanates and adducts thereof and processes for synthesizing the same are described, for example, in U.S. Pat. Nos. 4,663,377; 4,433, 095; 5,200,489; and 5,252,696, the entire disclosure of each of which is hereby incorporated by reference.

The polyisocyanates of the aqueous adhesive compositions of the present invention can be rendered hydrophilic by reaction with cationic, anionic and/or nonionic compounds containing isocyanate-reactive groups, or by admixture with external emulsifiers, or both, as is known in the art. Preferably, the polyisocyanate is rendered hydrophilic by the addition of the polyisocyanate with non-ionic polyalkylene, preferably ethylene, oxide unit-containing polyether alcohol. When an external emulsifier is used, the emulsifier also preferably is the reaction product of the polyisocyanate with a non-ionic ethylene oxide unit-containing polyether alcohol. As noted above, processes for synthesizing these and other types of polyisocyanates, and the resultant hydrophilically modified polyisocyanates, which can be used per se, or as an external emulsifier, or as both, are well known in the art, and are described, for example, in U.S. Pat. Nos. 4,663,377; 5,200,489; and 5,252,696, referenced above.

Suitable polyether alcohols include alkoxylation products of mono- and polyvalent (preferably monovalent) starter molecules, such as methanol, n-butanol, cyclohexanol, 3-methyl-3-hydroxymethyloxetane, phenol, ethylene glycol, propylene glycol, aniline, trimethylol propane or glycerine, which contain at least one polyether chain containing at least 10, generally 10 to 70, ethylene oxide units. The polyether chain present in the hydrophilically modified polyisocyanates generally have about 10 to 70 alkylene oxide units, and are either pure ethylene oxide chains or mixed polyalkylene oxide chains wherein the alkylene oxide units comprise at least about 60% of ethylene oxide units with a minimum of at least 10 such units. See U.S. Pat. Nos. 4,433,095 and 4,663,377, referenced above.

As the skilled artisan will appreciate, there are known variations for hydrophilically modifying polyisocyanates. For example, for reduced polyisocyanate viscosity, cycloaliphatic polyisocyanates can be hydrophilically modified by reaction with monofunctional polyether alcohols containing a statistical average of less than 10 ethylene oxide units, as described by U.S. Pat. No. 5,252,696. In this embodiment of the invention, preferably the polyisocyanate includes trimeric 1,6-diisocyanatohexane and optionally also includes dimeric 1,6-diisocyanatohexane.

Improved water dispersibility and hydrophilicity can also be provided by reacting a polyisocyanate adduct based on hexamethylene diisocyanate with a low molecular weight monohydroxy functional polyether prepared from ethylene oxide, as described in U.S. Pat. No. 5,200,489, referenced above. In this embodiment of the invention, a water-dispersible polyisocyanate adduct as described above, preferably containing isocyanaurate groups, is reacted with a monohydroxy functional polyether, wherein the ethylene oxide portion has a molecular weight of about 200 to about 1000, and the molecular weight of the entire polyether is about 200 to about 1500. The resultant hydrophilically modified polyisocyanates and processes for making the same are described in U.S. Pat. No. 5,200,489, also referenced above.

The resulting polyisocyanate mixtures can have an average isocyanate functionality of 1.8 to 6, an isocyanate content of about 5.0 to about 45% by weight, preferably about 15.0 to about 25.0% by weight, and contain about 2 to about 20% by weight of ethylene oxide units arranged within polyether chains. As will be appreciated by the skilled artisan, these properties can vary, according to the desired characteristics of the product, as well as the structure of and amounts of specific starting reactants.

Alternatively, compounds containing ionic groups or potential ionic groups can be used to render the polyisocyanate hydrophilic. Such compounds for providing hydrophilicity to the polyisocyanates may be cationic or anionic. Examples of anionic groups include carboxylate groups and sulphonate groups. Examples of cationic groups include quaternary ammonium groups and sulphonium groups. The ionic groups are formed by neutralizing the corresponding potential ionic groups either prior to, during, or after their reaction with the polyisocyanate. When the potential ionic groups are neutralized prior to forming the modified polyisocyanate, ionic groups are incorporated directly. When neutralization is performed subsequent to forming the prepolymer, potential ionic groups are incorporated. Suitable compounds for incorporating the previously discussed carboxylate, sulphonate, sulphonium and tertiary or quaternary ammonium groups are described in U.S. Pat. Nos. 3,479,310, 4,108,814, 3,419,533, and 3,412,054, the entire disclosure of each of which is herein incorporated by reference.

Further, to aid in water dispersibility of the polyisocyanate, the NCO functional groups of the polyisocyanate can be partially or substantially totally blocked using known blocking agents and processes, for example, as described in U.S. Pat. Nos. 5,296,160; 5,157,074; and 4,098,933, the entire disclosure of each of which is hereby incorporated by reference.

In addition to the previously discussed hydrophilic modifiers, which are chemically incorporated into the polyisocyanates, it is also possible to use external emulsifiers which may be anionic, cationic or nonionic. Preferably, the emulsifier includes an aliphatic or cycloaliphatic polyisocyanate or polyisocyanate adduct modified by reaction with nonionic alkylene, preferably ethylene, oxide unit-containing polyether alcohols by any of the processes described above.

Further, when dispersion stability is not a specific requirement, it is possible to disperse the polyisocyanate in water in the absence of emulsifiers by using high shear mixers, for example, those disclosed in British Pat. Nos. 1,414,930, 1,432,112 and 1,428,907 as well as German Offenlegungsschrift Pat. No. 2,347,299. Low shear mixers may also be used to disperse the polyisocyanate in water such as the stator-rotor dynamic mixer disclosed in U.S. Pat. No. 4,742,095.

An exemplary hydrophilically modified polyisocyanate compound is available from Bayer Inc. of Pittsburgh, Pa., under the trade designation Desmodur DA. This compound is described as a water-dispersible, solvent free polyisocyanate based on hexamethylene diisocyanate (HDI) having a NCO content of 18.5 to 20.5%. The compound is a trisisocyanatocycloalkyl-isocyanurate compound corresponding to the formula

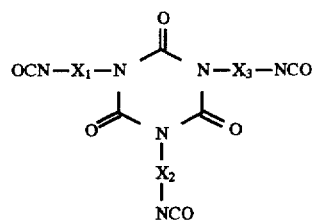

wherein each of $X_1$, $X_2$ and $X_3$ represent identical hydrocarbon radicals obtained by removing the isocyanate groups from 1,6-hexamethylene diisocyanate. The compound is hydrophilically modified by reaction with a polyether alcohol as described above.

The polyisocyanate compound is present in the aqueous adhesive composition in an amount of about 5 to about 55, and preferably about 25 to about 35, percent by weight, based upon the total weight of the solid components of the composition. The NCO content of the polyisocyanate compound can be between about 15 and about 25%.

The aqueous adhesive composition of the present invention also includes an aqueous dispersion of a halogenated polyolefin elastomer. The halogenated polyolefin can essentially be any natural or synthetic halogenated polyolefin elastomer. The halogens employed in the halogenated polyolefinic elastomer are typically chlorine or bromine, although fluorine can also be used. Mixtures of halogens can also be employed in which case the halogen-containing polyolefinic elastomer will have more than one type of halogen substituted thereon. The amount of halogen does not appear critical and can range from as low as about 3 weight percent to more than about 70 weight percent, depending on the nature of the base elastomer or poller. Halogenated polyolefins and their preparation are well-known to those skilled in the art.

Representative halogenated polyolefins include chlorinated natural rubber, chlorine- and bromine-containing synthetic rubbers including polychloroprene, chlorinated polychloroprene, chlorinated polybutadiene, hexachloropentadiene, chlorinated butadiene styrene copolymers, chlorinated ethylene propylene copolymers and ethylene/propylene/nonconjugated diene terpolymers, chlorinated polyethylene, chlorosulfonated polyethylene, brominated poly(2,3-dichloro-1,3-butadiene), copolymers of α-chloroacrylonitrile and 2,3-dichloro-1,3-butadiene, chlorinated poly(vinyl chloride), and the like, including mixtures of such halogen-containing elastomers. Thus substantially any of the known halogen-containing derivatives of natural and synthetic elastomers can be employed in the practice of this invention, including mixtures of such elastomers.

Preferred halogenated polyolefin elastomers include chlorosulphonated polymers of polyethylene. These compounds generally contain from about 10 to about 60%, and preferably about 15 to about 45%, of chlorine and from about 0.1 to about 5%, preferably about 0.5 to about 2.5%, of sulfur. It is believed that most of the chlorine is substituted along the hydrocarbon chain, and that the sulfur is combined with the chlorine, being attached to the chains as sulfonyl chloride groups. The substitution is believed to be random and in a preferred polymer there is an average of about one chlorosulfonyl group for every 17 carbon atoms. Chlorosulphonated polyethylene polymers are commercially available in a variety of grades with regard to density, molecular weight, and the like. Any one or a mixture of these grades may be used. In general it may be said that the chlorosulphonated polyethylenes have over 20 carbon atoms and molecular weights over 1000. U.S. Pat. No. 2,405,971 discloses a method of making a chlorosulphonated polyethylene, the entire disclosure of which is hereby incorporated by reference.

Aqueous dispersions of halogenated polyolefin elastomers, including aqueous dispersions of chlorosulphonated polyethylene, are commercially available, and techniques for producing such aqueous dispersions is known. Exemplary processes are described, for example, in U.S. Pat. Nos. 3,968,067; 4,070,825; 4,145,816; and 4,243,566 the entire disclosure of each of which is hereby incorporated by reference. Generally these processes include dissolving the elastomer in an organic solvent, followed by forming a water-based dispersion thereof with the aid of a surfactant. Remaining solvent can be removed, for example, by steam stripping. The resultant aqueous emulsion can be acidic, indicating removal of halogen and halosulphonyl groups during processing.

A particularly preferred aqueous dispersion of a chlorosulphonated polyethylene elastomer is commercially available from Burke Palmeson under the trade designation Hypalon 605, which is a latex of a chlorosulphonated polyethylene Hypalon 48. This is described in more detail below in the Examples.

The halogenated polyolefin elastomer is present in the aqueous adhesive composition of the present invention in an amount of about 20 to about 60 percent by weight, preferably about 35 to about 45 percent by weight, based on the total weight of the components of the composition.

The aqueous adhesive compositions of the present invention also include a curing agent capable of curing both the adhesive components and the vulcanization elastomeric rubber to which the adhesive is applied. Preferably the curing agent is a nitroso compound. The nitroso compound can be an aromatic hydrocarbon, such as benzenes, naphthalenes, anthracenes, biphenyls, and the like, containing at least two nitroso groups attached directly to non-adjacent ring carbon atoms. More particularly, such nitroso compounds are described as aromatic compounds having from 1 to 3 aromatic nuclei, including fused aromatic nuclei, having from 2 to 6 nitroso groups attached directly to non-adjacent nuclear carbon atoms. The presently preferred nitroso compounds are the di-nitroso aromatic compounds, especially the dinitrosobenzenes and dinitrosonaphthalenes, such as the m- or p-dinitrosobenzenes and the m- or p-dinitrosonaphthalenes. The nuclear hydrogen atoms of the aromatic nucleus can be replaced by alkyl, alkoxy, cycloalkyl, aryl, aralkyl, alkaryl, arylamine, arylinitroso, amino, halogen, and like groups. The presence of such substituents on the aromatic nuclei has little effect on the activity of the nitroso compounds in the present invention. As far as is presently known, there is no limitation as to the character of the substituent, and such substituents can be organic or inorganic in nature. Thus, where reference is made herein to nitroso compounds, it will be understood to include both substituted and unsubstituted nitroso compounds, unless otherwise specified.

Particularly preferred nitroso compounds are characterized by the formula: $(R)_m$—Ar—$(NO)_2$ wherein Ar is selected from the group consisting of phenylene and naphthalene; R is a monovalent organic radical selected from the group consisting of alkyl, cycloalkyl, aryl, aralkyl, alkaryl, arylamine, and alkoxy radicals having from 1 to 20 carbon atoms, amino, or halogen, and is preferably an alkyl group having from 1 to 8 carbon atoms; and m is zero, 1, 2, 3, or 4, and preferably is zero.

A wide variety of poly-C-nitroso aromatic compounds are operable in the present invention, including those listed in U.S. Pat. No. 2,905,582, which is hereby incorporated by reference. The preferred dinitroso compounds are m- and p-dinitrosobenzenes, of which the latter is especially preferred for economic reasons.

A partial non-limiting listing of nitroso compounds which are suitable for use in the practice of the invention include m-dinitrosobenzene, p-dinitrosobenzene, m-dinitrosonaphthalene, p-dinitrosonaphthalene, 2,5-dinitroso-p-cymeme, 2-methyl-1,4-dinitrosobenzene, 2-methyl-5-chloro-1,4-dinitrosobenzene, 2-fluoro-1,4-dinitrosobenzene, 2-methoxy-1-3-dinitrosobenzene, 5-chloro-1,3-dinitrosobenzene, 2-benzyl-1,4-dinitrosobenzene, 2-cyclohexyl-1,4-dinitrosobenzene and combinations thereof. Particularly preferred nitroso compounds include p-dinitrosobenzene and m-dinitrosobenzene.

The nitroso compound component is typically utilized in an amount from about 1 to about 30, preferably from about 10 to about 20, percent by weight of the total solids components of the adhesive composition.

Various additives such as fillers, dispersion aiding agents, viscosity controlling agents, acid scavengers, coating agents, and the like, may be included in the adhesive compositions in proportions known in the art. Fillers may enhance the viscosity and other properties desirable from the standpoint of application of the adhesive. Fillers include finely divided substantially inert solid materials, like carbon black, silica, titanium dioxide (pigment grade) and zinc oxide. For example, carbon black can be present in an amount of about 1 to about 30, preferably about 15, percent by weight, based on the total solids components of the adhesive composition.

The total solids content of the adhesive of the invention is between about 5 and about 60 percent, and preferably between about 35 and about 45 percent.

Generally the aqueous adhesive composition is maintained in two parts until just prior to application of the adhesive to a substrate surface. Each of the two parts is shelf stable, typically having a shelf life of up to about one year.

The first part of the aqueous adhesive composition includes the water-dispersible polyisocyanate. Other agents can be included in this part (referred to herein as "Part A" for convenience of discussion), including without limitation polyisocyanate viscosity lowering agents such as propylene carbonate, mono- and dialkyl ethers of ethylene glycol such as those available under the Cellosolve™ mark (i.e., ethylene glycol monobutyl ether), N-methyl-2-pyrrolidone (NMP), and the like, all as are known in the art.

The second part ("Part B") includes the aqueous dispersion of the halogenated polyolefin elastomer and the curing agent. Advantageously other components can be added, such as fillers, i.e., finely divided substantially inert solid materials such as carbon black. Another advantageous component is an acid scavenger, such as zinc oxide, magnesium oxide, dibasic lead phosphite, and the like. The acid scavenger can be present in an amount of about 1 to about 10, preferably about 2 to about 5, percent by weight, based on the total solids components of the adhesive composition. Such agents can provide heat aging resistance. Part B can also include a dispersing agent, such as lignosulfonates including as a basic lignin monomer unit a substituted phenyl propane, commercially available under the trade designation as Marasperse CBOS-4 from Ligno Tech USA and water, which can assist in achieving a desirable uniform coating of the adhesive on the substrate surface.

The above-described adhesive composition has marked advantages over currently available adhesives. The adhesive has great versatility, being capable of bonding a wide variety of substrates including metallic, ceramic, glass, and organic substrates. Suitable metallic substrates include any of the common structural metals including iron, steel, including stainless steel, lead, aluminum, copper, brass, bronze, Monel metal, nickel, zinc, and the like. The organic substrates include leather, and all common textile materials such as polyester, polyamide, rayon and cotton fabrics and cords, and the like. The textile substrates can also include glass fibers or filaments. The textile and/or glass fibers can be uncoated, or can be coated, for example with known resorcinol-formaldehyde-latex (RFL) coatings, such as described in U.S. Pat. No. 5,154,975. The textile and/or glass fibers can be treated with a suitable coating before being formed into cord or fabric, or the thus formed cord or fabric can be coated.

Such substrates can be bonded using the aqueous adhesive compositions of the invention to a wide variety of vulcanizable elastomers, including natural rubber; styrene-butadiene rubber (SBR) of both high and low durometer grades and oil-extended types; neoprene (G and W types); butyl rubber; chlorobutyl rubber; ethylene-propylene terpolymer rubber; butadiene-acrylonitrile rubber; chlorosulfonated polyethylene rubber; polyurethane rubber; polyacrylate rubber, ethylene-propylene copolymer rubber; and the like.

In use, Part A and Part B are combined to form the aqueous adhesive composition of the invention. As noted above, the polyisocyanate is substantially stable in an aqueous environment, preferably for up to at least about 24 hours. Thus, the aqueous adhesive composition of the invention advantageously has a pot life of at least about 24 hours after Parts A and B are combined, i.e., after the water-dispersible polyisocyanate is exposed to an aqueous environment (for example, after being added to an aqueous dispersion such as the water-dispersed halogenated polyolefin elastomer).

Typically, carbon dioxide and/or macromolecules can form after the polyisocyanate is added to water, resulting from the reaction of the polyisocyanate with water. This can result in increased porosity in the adhesive composition and thus in the composite structure. Thus, although the composition of the invention can exhibit good adhesive properties after about 24 hours, it is believed that when more than about 24 hours passes after Parts A and B are combined, typically, less desirable failure modes can result in the composite products. Further, when exposed to adverse environmental conditions, oil, water, and the like can invade and penetrate the composite structure through the pockets in the adhesive composition, thus potentially impairing the properties of the composite.

In the present invention, although carbon dioxide and/or macromolecule formation can occur upon addition of Part A to Part B, the degree and/or rate of such formation is minimal with regard to the effect thereof on the desired properties of the adhesive composition for up to at least about 24 hours. Accordingly, as used herein, the term substantially stable refers to the fact that after the polyisocyanate is exposed to an aqueous environment, the degree of carbon dioxide, macromolecule, etc. formation is such that the adhesive abilities and failure modes (as described in more detail below in the Examples) of composite structures formed using the composition of the invention are not significantly adversely affected. This is one significant advantage of the adhesive compositions of the present invention, i.e., the stability of the polyisocyanate after dispersion in water. Presently known aromatic polyisocyanates typically do not meet this requirement.

In general, after Part A and Part B are combined, the adhesive solution is then applied to one or both of the surfaces to be adhered, for example by spraying, dipping, brushing, and the like, and dried by removal of water and/or cosolvent or dispersing agent. The amount of adhesive applied will vary with the application method, material to which applied, and the elastomer to be bonded thereto. Drying may be accomplished under ambient conditions, e.g., room temperature, or by the use of heat or forced air, i.e., from about 20° to 25° C. to about 160° C. and higher. Room temperature drying generally takes about 30 to about 60 minutes, whereas drying at elevated temperatures can vary from about 1 to about 5 minutes.

The adhesive coated substrates may be bonded to elastomers by application of the adhesive coated material to vulcanizable elastomer and curing the elastomer. Curing of the elastomer also causes curing of the adhesive and bonding of the substrate to the elastomer. Depending upon the particular elastomer, curing can be carried out at temperatures ranging from about 240° F. to about 400° F. for a time commensurate with the temperature employed. Curing may require as long as several hours at relatively low temperatures, e.g., 240° F., whereas at the higher temperatures, curing may occur in a few minutes. For most elastomers, representative curing conditions are about 288° F. to about 320° F. for about 5 to about 30 minutes.

Two or more layers can be bonded together to form a multilayered structure. For example, an adhesive coated material can be sandwiched between and bonded to outer vulcanizable elastomer layers to form a composite multilayer structure. Additional adhesive treated substrates, such as a fabric backing, can also be applied to an outer surface of the multilayered structure. Exemplary articles which can be formed using the adhesives of the invention include any of a wide variety of reinforced belts, for example synchronous and serpentine belts for the automotive industry and other industrial applications, which can include a fiberglass reinforcing layer sandwiched between outer vulcanized rubber layers, hoses, air springs, and the like.

The present invention will be further illustrated by the following non-limiting examples.

EXAMPLE 1

Preparation of Aqueous Adhesive Compositions

An exemplary aqueous adhesive composition according to the present invention was prepared having the composition set forth in Table 1 below.

TABLE 1

| | Material | % TSC (%) | Wet Weight (%) | Dry Weight (%) |
|---|---|---|---|---|
| Part A | #1 Desmodur DA | 100.0 | 11.89% | 28.37% |
| | #2 Propylene Carbonate | 0.0 | 2.38% | — |
| Part B | #3 Hypalon 605 latex | 51.0 | 32.04% | 39.01% |
| | #4 Sterling NS | 100.0 | 5.94% | 14.18% |
| | #5 DNB wetcake | 59.6 | 9.97% | 14.18% |
| | #6 Kadox 911-Zinc Oxide | 100.0 | 1.49% | 3.55% |
| | #7 Marasperse | 100.0 | 0.30% | 0.71% |
| | #8 Water | 0.0 | 36.00% | — |

Part A was prepared by adding the polyisocyanate to propylene carbonate to form a solution thereof. Part B was formed by dispersing a curing agent dinitrosobenzene carbon black (Sterling NS, available from Cabot), and zinc oxide (Kadox 911, available from Zinc Corp. of America), with the aid of a surfactant Marasperse, available from Ligno Tech USA. A latex, available from Burke-Palmeson under the designation Hypalon 605 (a suspension of latex particles in water) was combined with the dispersed mixture. Additional water was also added.

The physical properties of the chlorosulphonated polyethylene (Hypalon 605) include:

| | |
|---|---|
| Color: | White |
| Total Solids: | 50% |
| Specific Gravity: | 1.13 |
| pH: | 2.5 to 6.5 |
| Particle size: | <1.0 microns |
| Surface tension: | 38 dynes/cm |
| Viscosity | 2000 cps LV #3 at 12 rpm |

As noted above, Hypalon 605 is an aqueous latex including Hypalon 48, a chlorosulphonated polyethylene from Burke-Palmeson, which includes about 43% chlorine and about 1.0% sulfur.

Aqueous dispersions of various other halogenated polyolefin elastomers were also prepared and used as a component in aqueous adhesive compositions of the invention. Various types of aqueous chlorosulphonated polyethylene latexes were used as the halogenated polyolefin elastomer component. The latexes included various chlorosulphonated polyethylenes available from Burke-Palmeson, including Hypalon 40 and Hypalon 45, and CSM 450, a Hypalon 45 latex from Sumitomo Seika of Japan. The primary difference in the chlorosulphonated polyethylenes is the total percentages of chlorine and sulfur. In addition, an aqueous latex of a dichlorobutadiene homopolymer was also prepared and used as a component in the aqueous adhesive compositions of the invention.

EXAMPLE 2

Evaluation of Bond Strengths for Various Rubbers

The aqueous adhesive composition prepared as described in Example 1 was used to bond various types of rubbers to RFL treated fiberglass cords. The elastomeric rubbers used were: HNBR (hydrogenated nitrile butadiene rubber) compounds (both sulfur and peroxide cured) and HNBR including 30% ZSC (a zinc dimethylacrylate grafted hydrogenated nitrile butadiene rubber which exhibits excellent aging properties, available from Zeon Chemicals, Inc. of Louisville, Ky. and described in "High Strength HNBR— The New Benchmark Elastomer for Automotive Synchronous and Serpentine Belts, by W. Bradford and M. Wood).

The following components and conditions were used:

| | |
|---|---|
| Substrate: | RFL treated fiberglass cord |
| Elastomers: | 1 - Sulfur cured HNBR compound |
| | 2 - Peroxide cured HNBR compound |
| | 3 - HNBR/ZSC compound |
| Cure Times: | 1 - 17 minutes at 320° F. |
| | 2 - 48 minutes at 320° F. |
| | 3 - 39 minutes at 320° F. |

Cords were coated by dipping the cords through an adhesive bath and drying them at room temperature for 30–45 minutes. The cords were then laid side by side to form a 1 inch×5 inch section of cord on a 5 inch×7 inch piece of rubber. A maximum of 6-1 inch sections were placed on the rubber pad and separated from each other by two pieces of aluminum wire. A piece of adhesive treated nylon was then placed on top of the cords and the entire pad was placed in a compression mold and allowed to cure at the above times and temperatures. After molding, the pads were cut apart between the aluminum wires and the individual sections were exposed to the appropriate environments.

The bond strength of the composition of the invention (designated as Sample A) was compared to that exhibited by solvent based adhesives commercially available from Lord Corporation under designations Chemlok 233X ("CH233X") and Chemlok 402X ("CH402X"). CH223X and CH402X are made according to U.S. Pat. No. 3,830,784 and include chlorosulphonated polyethylene, aromatic polyisocyanate, dinitrosobenzene, and organic solvent.

The cord/fabric section was pulled from rubber section and the peak kilograms pull and failure modes were recorded, as set forth in Table 2 below.

TABLE 2

| Elastomer | Adhesive | Initial Strength (kgf-failure) | After 7 days at 140° C. (kgf-failure) |
|---|---|---|---|
| −1 | CH233X | 44.6-SR/RC | 77.1-R/TR |
| sulfur | CH402X | 50.1-R/SR | 67.6-SB |
| cured | Sample A | 39.9-SR/RC | 74.8-R/TR |
| −2 | CH233X | 21.8-SR/RC | 26.8-SR |
| peroxide | CH402X | 18.8-RC | 15.9-RC |
| cured | Sample A | 34.5-SB | 31.8-R/SB |
| −3 | CH233X | 20.0-RC | 11.3-RC |
| ZSC | CH402X | 20.8-RC | 12.7-RC |
| compound | Sample A | 20.0-RC/SR | 30.4-SB |

Failure modes: SB-Stock Break/SR-Spotty Rubber/R-Rubber/TR-Thin Rubber/RC-Rubber to Cement Failure modes included the following: SB (stock break); R (rubber); TR (thin rubber); SR (spotty rubber); and RC (rubber to cement). RC, the least preferred failure mode, indicates that the weakest link in the rubber/cord composite is the bond between the adhesive and the vulcanized elastomer. SB, R, TR, and SR each describe to varying degrees the amount of rubber that remains bonded to the cord after the composite has been destructively tested for bond strength. In order of most rubber retention to least rubber retention the failure mode can be described in the following way. SB, which is generally the most preferred failure mode, indicates that the bond strength between the substrate and the vulcanized elastomer is greater than the ultimate tensile strength of the elastomer, and that the elastomer fails in an abrupt manner. R and TR are also desirable failure modes that indicate the bond strength is equal to that of the elastomer, but that the elastomer fails internally at a constant rate. SR, a less desirable failure mode, refers to failure of the rubber stock in discrete areas of the composite and failure of the adhesive in other areas of the composite. The areas of rubber failure are exhibited generally by portions of rubber adhering to the cord when the composite is destructively tested.

EXAMPLE 3

Comparison between Blocked Aliphatic Polyisocyanate and Unblocked Polyisocyanate This example compares adhesive properties of a blocked aliphatic polyisocyanate and an unblocked polyisocyanate. The adhesive including the unblocked polyisocyanate was prepared as described in Example 1 and is referred to as Sample A. Bayhydur 116, an MEK (methyl ethyl ketone) oxime blocked aliphatic polyisocyanate based on HDI (available from Bayer, Inc.) was used in Sample B.

The results are set forth in Tables 3 and 4 below. Results were very similar after heat aging, but initial strength and adhesion after 1 hour boiling water are somewhat lower for the adhesive including the blocked compound. It is believed that more heat or the addition of a catalyst could increase the adhesion properties of the adhesive containing blocked aliphatic based isocyanate to the level of Sample A. The same elastomers described in Example 2 were used in this example.

TABLE 3

Sample A - 20 parts Desmodur DA and Hypalon 605;
elastomers were cured at T90 + 10 minutes at 320° F.

| Elastomer | HNBR Sulfur-Cured | HNBR Peroxide-Cured | HNBR 30% ZSC |
|---|---|---|---|
| Initial Strength | 39.9 kgf/25 mm (SR/RC) | 34.5 kgf/25 mm (SB) | 20.0 kgf/25 mm (SR/RC) |
| After Heat Aging (7 days @ 140° C.) | 74.8 kgf/25 mm (R/TR) | 31.8 kgf/25 mm (R/SB) | 30.4 kg/25 mm (SB) |
| After Boiling H2O (1 hour @ 100° C.) | 34.5 kgf/25 mm (SR/RC) | 34.5 kgf/25 mm (SB) | 20.0 kgf/25 mm (RC/SR) |

TABLE 4

Sample B - 20 parts Bayhydur 116 and Hypalon 605;
elastomers were cured at T90 + 10 minutes at 320° F.

| Elastomer | HNBR Sulfur-Cured | HNBR Peroxide-Cured | HNBR 30% ZSC |
|---|---|---|---|
| Initial Strength | 18.6 kgf/25 mm (RC) | 31.8 kgf/25 mm (SR/RC) | 10.9 kgf/25 mm (RC) |
| After Heat Aging (7 days @ 140° C.) | 88.5 kgf/25 mm (SB) | 30.4 kgf/25 mm (R/SR) | 19.1 kgf/25 mm (SB) |
| After Boiling H2O (1 hour @ 100° C.) | 19.1 kgf/25 mm (SR/RC) | 37.2 kgf/25 mm (R/SR/RC) | 8.6 kgf/25 mm (RC) |

EXAMPLE 4

Evaluation of Differing Levels of Isocyanate and Different Types of Halogenated Polyolefin Elastomers The adhesive properties of compositions according to the invention having differing amounts of polyisocyanate and different halogenated polyolefin elastomers were evaluated. Sample C used a constant isocyanate level of 10 parts, as opposed to 20 parts used in Sample A of Example 3 above. Sample D included a dichlorobutadiene as the halogenated polyolefin. Sample E included a latex of Hypalon 45. Table 5 shows the dry weight parts of the materials used in the study.

TABLE 5

| Material | Sample C | Sample D | Sample E |
|---|---|---|---|
| Sterling NS | 10 | 10 | 10 |
| DNB | 10 | 10 | 10 |
| ZnO | 2.5 | 2.5 | 2.5 |
| Marasperse | 0.5 | 0.5 | 0.5 |
| Hypalon 605 | 27.5 | — | 22 |
| DCD homopolymer | — | 27.5 | — |
| Hypalon 45 latex | — | — | 5.5 |
| Desmodur DA | 10 | 10 | 10 |

Table 6 illustrates the results of bonding strength tests. The modified H-Block Test was used for screening the different latex compositions. For the modified H-Block test, treated cords were strung in a frame mold and a 1"×½"×½" block of rubber was compression molded to them. The rubber flash was trimmed from the cords plus the rubber block was cut in half in the 1" dimension to create a ½" square piece of rubber on the end of the cord. The cords were pulled through the rubber and the peak pull valves were recorded.

TABLE 6

HNBR cord bonding experiments (Modified H-block Test)

| | | Elastomer | |
|---|---|---|---|
| Study 1 Adhesive | Type Latex | −1 Sulfur Cure #'s to failure | −2 Peroxide cure #'s to failure |
| Sample C | 605 | 82 | 66 |
| Sample D | DCD | 61 | 55 |
| Sample E | 605/45 | 78 | 77 |

EXAMPLE 5

Use of Acid Scavenger

Bond strengths were evaluated comparing adhesives with and without ZnO. Sample F has the same dry weight parts as Sample A of Example 3 above with the exception of ZnO. Sample A has 2.5 parts of ZnO and Sample F has no ZnO in its formulation. Results were quite similar for both adhesives except in the case heat aging resistance on the ZSC compound. Sample A provided a stock break and 30.4 kgf, while Sample F only provided 15.4 kgf and failed RC (rubber to cement). The results are set forth in Tables 7 and 8 below.

TABLE 7

Results using Sample A with 20 parts
Desmodur DA and Hypalon 605
elastomers were cured at T90 + 10 minutes at 320° C.

| Elastomer | HNBR Sulfur-cured | HNBR Peroxide-cured | HNBR 30% ZSC |
|---|---|---|---|
| Initial Strength | 39.9 kgf/25 mm (SR/RC) | 34.5 kgf/25 mm (SB) | 20.0 kgf/25 mm (SR/RC) |
| After Heat Aging (7 days @ 140° C. | 74.8 kgf/25 mm (R/TR) | 31.8 kgf/25 mm (R/SB) | 30.4 kgf/25 mm (SB) |

TABLE 8

Results using Sample F with 20 parts Desmodur DA and
Hypalon 605 without ZnO

| Elastomer | HNBR Sulfur-cured | HNBR Peroxide-cured | HNBR 30% ZSC |
|---|---|---|---|
| Initial Strength | 40.4 kgf/25 mm (SR) | 31.7 kgf/25 mm (R/TR) | 20.1 kgf/25 mm (RC/SR) |
| After Heat Aging (7 days @ 140° C. | 89.8 kgf/25 mm (SB) | 29.9 kgf/25 mm (R) | 15.4kgf/25 mm (RC) |

EXAMPLE 6

Evaluation of Different Levels of Polyisocyanate

Different levels of polyisocyanate were evaluated in the following study. The Modified H-Block pull test was used to test adhesion to RFL treated fiberglass cord. The following dry weight formulations were used in the study.

TABLE 9

| Material | Sample G | Sample H | Sample I | Sample J |
|---|---|---|---|---|
| Sterling NS | 10 | 10 | 10 | 10 |
| DNB | 10 | 10 | 10 | 10 |
| ZnO | 2.5 | 2.5 | 2.5 | 2.5 |
| Marasperse | 0.5 | 0.5 | 0.5 | 0.5 |
| Hypalon 48 Latex | 27.5 | 27.5 | 27.5 | 27.5 |
| Desmodur DA | 10 | 15 | 20 | 30 |

TABLE 10

| Adhesive | Sulfur cured HNBR (lbs) | Peroxide cured HNBR (lbs) | 30% ZSC HNBR (lbs) |
|---|---|---|---|
| Sample G | 85 | 81 | 54 |
| Sample H | 90 | 80 | 65 |
| Sample I | 101 | 74 | 75 |

A level of 20 parts of polyisocyanate provided good overall results for adhesion to three different types of HNBR compounds using the Modified H-Block pull test; Sample I adhesive provided the highest pull values on the sulfur cured HNBR and the 30% ZSC compound while still providing adequate adhesion to the peroxide cured HNBR.

In additional work, the level of polyisocyanate in Sample J was compared to the level of polyisocyanate in Sample I, using the Glass Cord peel test described previously in Example 2. The dry weight formulations of both adhesives are shown above in Table 9. The adhesion samples were tested for initial strength and also for resistance to heat aging and boiling water exposure. The results are set forth in Table 11 below. Reported results are peak kilograms to failure/failure mode.

TABLE 11

| Adhesive | Condition | Elastomer | | |
|---|---|---|---|---|
| | | Sulfur | Peroxide | ZSC |
| Sample I | Initial Strength | 21.8/SR/RC | 35.8/R | 22.2/SR/RC |
| | 7 days @ 140° C. | 95.2/SB | 31.8/R | 39.0/SB |
| | 1 hr boiling H2O | 22.2/SR/RC | 37.6/SB | 19.5/SR/RC |
| Sample J | Initial Strength | 44.5/SR/RC | 38.1/SB/R | 18.1/SR/RC |
| | 7 days @ 140° C. | 74.4/R/TR | 29/SB | 24.5/SB/R/RC |
| | 1 hr boiling H2O | 39.9/SR/RC | 34.5/SB | 17.7/SR/RC |

Results between the 20 parts of polyisocyanate and 30 parts of polyisocyanate are very similar.

EXAMPLE 7

Effect of Curing Agent

The peel test described above was used to investigate the effect of the absence of a crosslinking or curing agent in the adhesive composition. The samples below are similar to the adhesive composition of Sample A of Example 3 above but without the crosslinking agent DNB. Sample K and Sample L included the Hypalon 605 latex, while Sample M included the dichlorobutadiene latex as a film former. The following formulations were used in the study.

TABLE 12

| Material | Sample K | Sample L | Sample M |
|---|---|---|---|
| Sterling NS | 10 | 10 | 10 |
| DNB | — | — | — |
| ZnO | 2.5 | 2.5 | 2.5 |
| Marasperse | 0.5 | 0.5 | 0.5 |
| Hypalon 605 | 27.5 | 27.5 | — |
| DCD Latex | — | — | 27.5 |
| Desmodur DA | 20 | 16 | 20 |

The peel test results are set forth in Table 13 and show that the presence of a crosslinking agent such as DNB is necessary in the adhesive composition to bond vulcanizable rubber to a substrate. No rubber retention was observed on any of the samples that did not have DNB in them, nor did the pull values measure up to those observed with the crosslinking agent in the composition. For reference, the values obtained with an adhesive composition including a crosslinking agent is shown in Table 13 for a composition formulated as described with regard to Sample A of Example 3 above.

TABLE 13

| Adhesive | Condition | Elastomer | | |
|---|---|---|---|---|
| | | Sulfur (kgf/failure) | Peroxide (kgf/failure) | ZSC (kgf/failure) |
| Sample K | Initial Strength | 9.3/RC | 4.9/RC | 11.2/RC |
| Sample L | Initial Strength | 6.4/RC | 4.8/RC | 9.6/RC |
| Sample M | Initial Strength | 14.8/RC | 12.3/RC | 8.8/RC |
| Sample A | Initial Strength | 39.9/SR/RC | 34.5/SB | 20.0/RC/SR |

In addition to the RC (rubber to cement) failure, there were also some samples that had the cement to RFL failure. Here the adhesive did not even adhere to the substrate.

The foregoing examples are illustrative of the present invention, and are not to be construed as limiting thereof. The invention is defined by the following claims, with equivalents of the claims to be included therein.

That which is claimed is:

1. An article having a vulcanized elastomeric rubber portion thereof, comprising:
   a substrate having a surface;
   a vulcanizable elastomeric rubber layer adjacent said surface; and
   an adhesive layer disposed between and bonding together said substrate and said vulcanizable elastomeric rubber layer, said adhesive comprising:
   a water-dispersible polyisocyanate;
   an aqueous dispersion of a halogenated polyolefin elastomer; and
   a curing agent.

2. The article according to claim 1 wherein said polyisocyanate is an aliphatic or cycloaliphatic polyisocyanate or mixture thereof.

3. The article according to claim 2 wherein said polyisocyanate is selected from the group consisting of 1,4-diisocyanatobutane, 1,5-diisocyanato-2,2-dimethylpentane, 2,2,4- and 2,4,4-trimethyl-1,6-diisocyanatohexane, 1,10-diisocyanatodecane, 4,4'-diisocyanato-dicyclohexylmethane, 1,6-hexamethylene diisocyanate, 1,12-dodecane diisocyanate, cyclobutane-1,3-diisocyanate, cyclohexane-1,3- and/or 1,4-diisocyanate, 1-isocyanato-3,3,5-trimethyl-5-isocyanatomethyl cyclohexane (isophorone or IPDI).

4. The article according to claim 3 wherein said polyisocyanate is 1,6-hexamethylene diisocyanate.

5. The article according to claim 1, wherein said halogenated polyolefin elastomer is a chlorosulphonated polyethylene.

6. The article according to claim 1, wherein said curing agent is dinitrosobenzene.

7. The article according to claim 1, wherein said substrate comprises glass fibers.

8. The article according to claim 7, wherein said substrate comprises resorcinol-formaldehyde-latex (RFL) treated fiberglass cord.

9. An article according to claim 1, wherein said substrate is a textile substrate.

10. The article according to claim 9, wherein said textile substrate comprises polyester, polyamide, rayon, or cotton fabric or cord.

11. The article according to claim 1, wherein said vulcanizable elastomeric rubber is selected from the group consisting of natural rubber, styrene-butadiene rubber, neoprene, butyl rubber, chlorobutyl rubber, ethylene-propylene terpolymer rubber, butadiene-acrylonitrile rubber, chlorosulfonated polyethylene rubber, polyurethane rubber, polyacrylate rubber, ethylene-propylene copolymer rubber, and mixtures thereof.

12. The article according to claim 11, wherein said vulcanizable elastomeric rubber is a zinc dimethylacrylate grafted hydrogenated butadiene-acrylonitrile rubber.

13. A process for bonding a vulcanizable elastomer rubber to the surface of a substrate, comprising:

applying to a surface of a substrate an aqueous adhesive composition comprising a water-dispersible polyisocyanate; an aqueous dispersion of a halogenated polyolefin elastomer; and a curing agent;

contacting said surface with a surface of a vulcanizable elastomeric rubber layer, to which the adhesive is optionally applied; and curing said adhesive and said vulcanizable elastomeric rubber layer to bond said substrate and said vulcanizable elastomeric rubber to form a unitary structure.

14. An aqueous adhesive composition useful for bonding vulcanizable elastomeric rubbers to a substrate, comprising:

a water-dispersible polyisocyanate;

an aqueous dispersion of a halogenated polyolefin elastomer; and a curing agent.

15. The aqueous adhesive composition according to claim 14, wherein said water-dispersible polyisocyanate is substantially stable in an aqueous environment for at least about 24 hours.

16. The aqueous adhesive composition according to claim 14 wherein said composition comprises a dispersion of a first component comprising said water-dispersible polyisocyanate into a second component comprising said aqueous dispersion of a halogenated polyolefin elastomer and said curing agent.

17. The aqueous adhesive composition according to claim 14 wherein said polyisocyanate is selected from the group consisting of 1,4-diisocyanatobutane, 1,5-diisocyanato-2,2-dimethylpentane, 2,2,4- and 2,4,4-trimethyl-1,6-diisocyanatohexane, 1,10-diisocyanatodecane, 4,4'-diisocyanato-dicyclohexylmethane, 1,6-hexamethylene diisocyanate, 1,12-dodecane diisocyanate, cyclobutane-1,3-diisocyanate, cyclohexane-1,3- and/or 1,4-diisocyanate, 1-isocyanato-3,3,5-trimethyl-5-isocyanatomethyl cyclohexane (isophorone or IPDI).

18. The aqueous adhesive composition according to claim 17 wherein said polyisocyanate is 1,6-hexamethylene diisocyanate.

19. The aqueous adhesive composition according to claim 14 wherein said water-dispersible polyisocyanate is rendered hydrophilic by the reaction of said polyisocyanate with a compound containing a nonionic, cationic or anionic hydrophilic isocyanate-reactive group.

20. The aqueous adhesive composition according to claim 14, wherein said halogenated polyolefin elastomer is a chlorosulphonated polyethylene and wherein said curing agent is dinitrosobenzene.

21. The aqueous adhesive agent according to claim 14 further comprising:

a filler; and an acid scavenging agent.

22. The aqueous adhesive composition according to claim 14 further comprising an agent for lowering the viscosity of said polyisocyanate to assist dispersion of said polyisocyanate into said aqueous adhesive composition.

* * * * *